C. E. FAULKS.
AIR BRAKE ATTACHMENT.
APPLICATION FILED SEPT. 12, 1912.
1,059,290.
Patented Apr. 15, 1913.
3 SHEETS—SHEET 1.
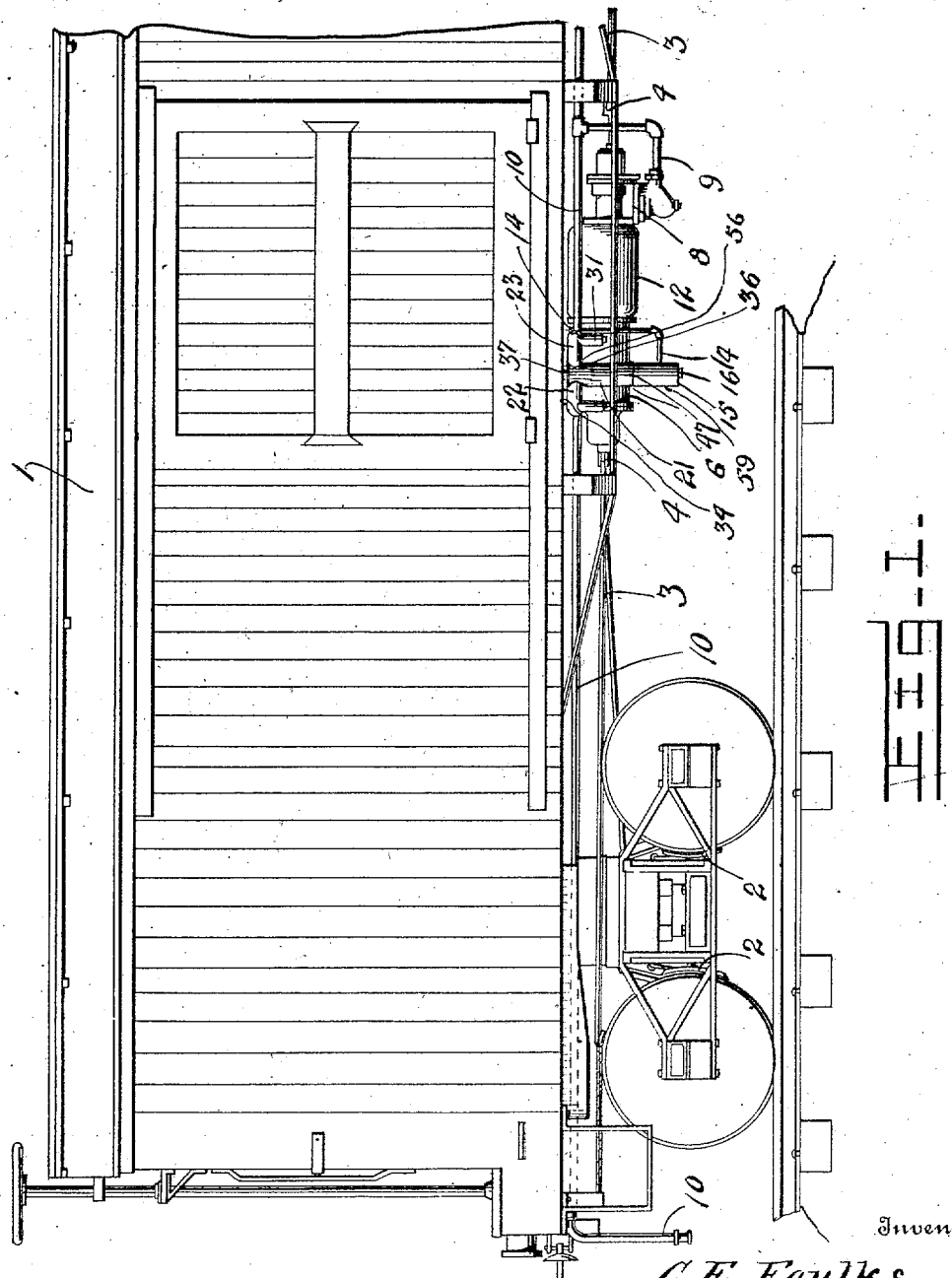

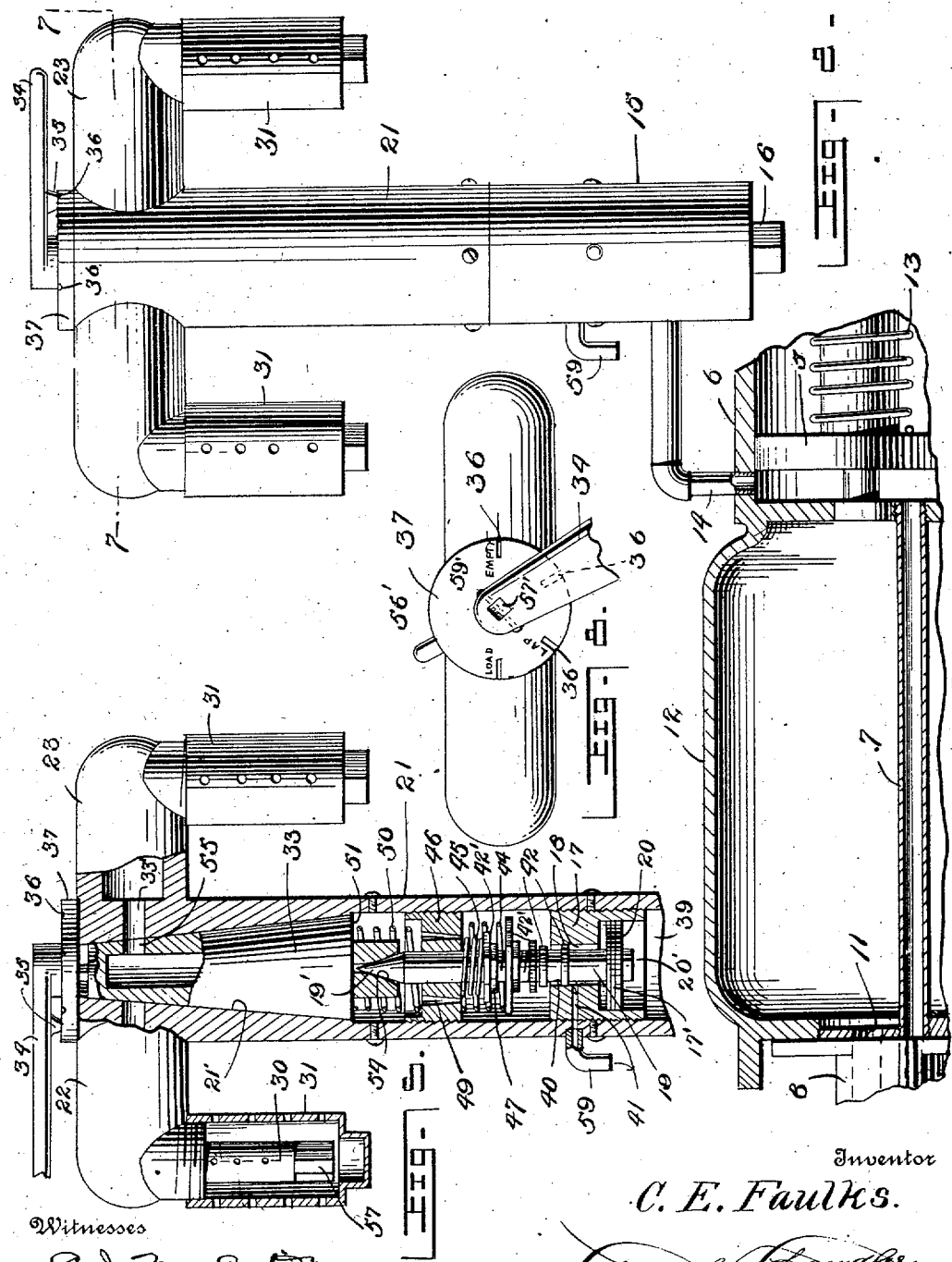

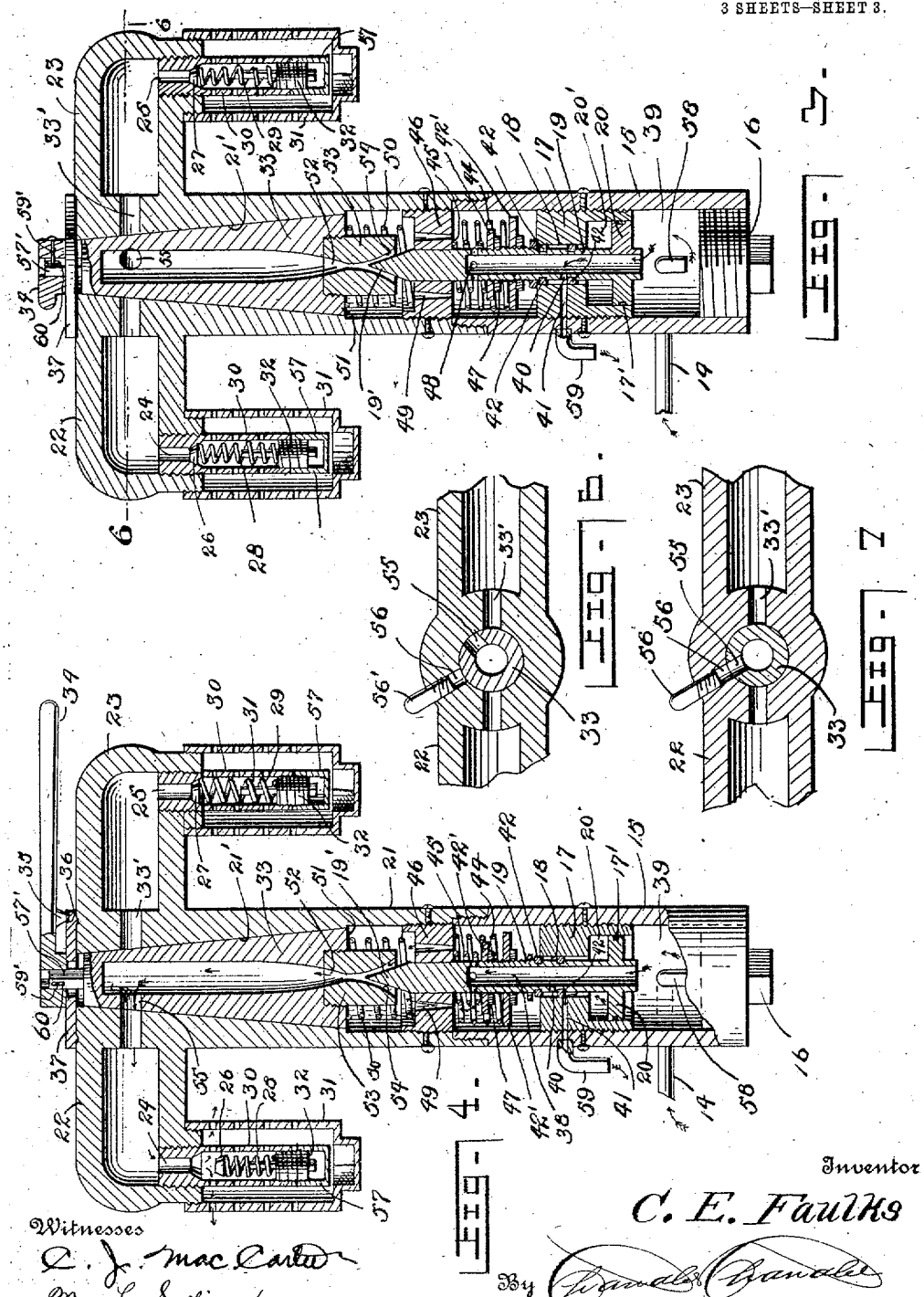

UNITED STATES PATENT OFFICE.

CHELCIAS E. FAULKS, OF PUEBLO, COLORADO.

AIR-BRAKE ATTACHMENT.

1,059,290.  Specification of Letters Patent.  Patented Apr. 15, 1913.

Application filed September 12, 1912. Serial No. 720,049.

*To all whom it may concern:*

Be it known that I, CHELCIAS E. FAULKS, a citizen of the United States, residing at Pueblo, in the county of Pueblo, State of Colorado, have invented certain new and useful Improvements in Air-Brake Attachments; and I do hereby declare the following to be a full, clear, and exact description of the invention, such as will enable others skilled in the art to which it appertains to make and use the same.

This invention relates to improvements in attachments for air brakes, and has for its leading object the provision of an improved device which may be readily secured to an ordinary brake cylinder of a Westinghouse air brake and which will enable the trainmen to control the amount of pressure which may pass from the auxiliary reservoir or from the train pipe into the brake cylinder and prevent the service pressure from locking the wheels which would cause the sliding thereof.

The further object of my invention is the provision of an improved attachment for brake cylinders whereby the limit of pressure may be held in said cylinders may be adjusted as desired or whereby said cylinders may be placed in direct communication with the outer air to absolutely prevent application of the brakes, except in an emergency application.

Another object of my invention is the provision of an improved attachment of this character which, while in no way interfering with the application of the brakes when desired, will prevent the brakes from being applied by a slight leakage of the triple valve or on account of but a slight reduction in the pressure in the train pipe.

Other objects and advantages of my improved air brake attachment will be readily apparent by reference to the following description taken in connection with the accompanying drawings, and it will be understood that I may make any modifications in the specific structure shown and described within the scope of my claims without departing from or exceeding the spirit of my invention.

Figure 1 represents a side elevation of a car, equipped with a Westinghouse air brake and having my attachment secured to the cylinder of the air brake, Fig. 2 represents an enlarged side elevation of my attachment, portions of the auxiliary reservoir and brake cylinder being shown in section, Fig. 3 represents a sectional view of my device showing the various parts in their normal position, Fig. 4 represents a sectional view showing the position of the various parts when the brakes are applied to a car with my device set for empty and the pressure in the auxiliary reservoir is greater than can safely be applied to the brakes without locking the wheels, Fig. 5 represents a similar sectional view showing the parts in emergency position, Fig. 6 is a fragmentary horizontal sectional view on the line 6—6 of Fig. 3, Fig. 7 is a fragmentary horizontal sectional view on the line 7—7 of Fig. 2. Fig. 8 is a plan view of my attachment, the device being in neutral position.

In the drawings, the numeral 1 designates a freight car having the usual brakes 2 from which lead the connections 3 to the end of the brake piston rod 4. Said piston 4 has on one end the piston head 5 working in the brake cylinder 6 having leading thereinto the pipe 7. Said pipe passes through the auxiliary reservoir 12 and leads to the casing 8 of the regular Westinghouse triple valve, which casing has leading thereinto the branch 9 of the train pipe 10 and the opening 11 which leads to the auxiliary reservoir 12 which serves to normally apply the brakes as will be readily understood by those familiar with the Westinghouse or other air brakes. A spring 13 within the cylinder 6 bears against the inner face of the piston head 5 to normally hold the brakes in disengaged position.

Tapped into the end of the cylinder 6 is a pipe 14 having its other end engaged in the lower section 15 of my improved valve casing, whereby any pressure in the brake cylinder from either the train pipe or the reservoir 12 will pass into the casing 15. Said casing 15 is closed at its lower end by the screw plug 16 which may be removed when it is desired to clean the casing while extending across the upper portion is the removable partition 17 having formed therethrough the passage 18 for the piston rod 19 which carries on its lower end a piston 20. This piston plays in a recess 20' formed in the lower end of the said partition 17, and has a packing ring 17', to form an air tight engagement between the side walls of the recess and the piston.

The end of the pipe 14, within the chamber 39, has a downwardly turned portion 58, which directs any foreign matter, in the entering air, to the bottom of the chamber.

Secured by a thread connection to the upper end of the section 15 of the casing is a second section 21 having the laterally extending branches 22 and 23 at the upper end thereof, said branches terminating in the discharge ports 24 and 25 controlled by the blow-off valves 26 and 27 normally held in closed position by the springs 28 and 29 disposed within the perforated tubes 30. Said tubes 30 are surrounded by the larger perforated casing 31 which in connection with the tubes 30 form mufflers to decrease the noise of the air escaping from either of the blow-off valves. The spring 28 is considerably weaker than the spring 29, whereby the valve 24 will blow off at considerably lower pressure than the valve 25, the tension of the springs being adjusted by turning of the plugs 32 which are engaged in the lower ends of the tubes 30. A cap 57 is screwed on each of the plugs 32, and binds against the lower end of the casing 30, in the manner of a jam or lock nut, to prevent the advance movements of the plugs.

In order to cause the air inclosed within the casing to pass into either of the branches 22 or 23 as desired, I employ the hollow-stemmed three-way valve 33 controlled by the handle 34 having a rib 35 adapted to fit into one of the notches 36 of the casing plate 37 to lock the handle in adjusted position, said handle being sufficiently resilient to permit of springing of the rib out of the notches as desired. Said valve is so constructed that when disposed over the space marked "Empty" it will cause air from the casing 21 to pass through the branch 22 to the valve 26 while turning of the handle to lie over the word "Loaded" will cause the air to pass across the passage 33' to the valve 27. The valve 33 may also be shifted to an intermediate or "lap" position where it will prevent air from passing out of the casing 21 or may be shifted into cut-out position to cut out my attachment and allow any air in the casings 15 and 21 to pass directly upward through the valve, the passage 55, port 56 and nipple 56', into the outer air.

In order that my device may so operate as to prevent a slight reduction in the train pipe pressure from setting the brakes of a car, I form the piston rod 19 with the central passage 38 in communication with the space 39 at the lower end of the casing 15, while formed in the side of the piston rod is a small aperture 40 normally in alinement with the passage 41 extending outward through the partition 17 and casing wall 15. Slight pressure in the space 39 will pass upward in the passage 38 of the piston rod, thence outward through the aperture 40 and passage 41, and will prevent the pressure from accumulating in the space 39 and consequently in the end of the brake cylinder. Threaded into the casing 15, and over the passage 41, is a downturned nipple 59, which prevents any dust, cinders, or other foreign substance getting into the said passage. Packing rings 42 on the piston rod 19 prevent the said air under pressure from passing downward against the upper face of the piston head 20. To normally hold the piston downward against the slight pressure against the lower face thereof, I mount on the piston rod the nuts 42' against which bear, the lower ends of the light helical spring 45, and the heavier helical spring 44, said springs being concentrically arranged. The light spring has its upper end in constant engagement with the lower face of the collar or bushing 46 which is screwed into the lower end of the section 21 of the casing, and is locked in adjusted position by the jam nut 47. The heavier spring 44 is normally out of engagement with the bushing 46, but is brought into engagement therewith when there is sufficient pressure in the space or chamber 39 to force the piston and piston rod upward. This upward forcing of the piston shifts the aperture 40 above the passage 41 and moves the lower of the packing rings 42, to completely cover the passage, which shuts off the flow of air out through said passage when the device is in service position, the spring 44 contacting with the bushing 46, to limit the upward movement of the piston and piston rod.

The passage 38 of the piston rod terminates in the apertures 48 disposed above the nuts 42', the air passing through said ports 48 and upward through the passages 49 formed in the bushing 46. Said bushing has a recess in its upper face in which rests the lower end of the spring 50 the upper end of which bears against the lower end 51 of the upwardly tapering valve 33 which fits within the correspondingly tapered seat 21' in the section 21. The valve 33 has on its lower end a nozzle 53 disposed normally a slight distance above the upper end of the piston rod, and having a vertical bore which flares upwardly as at 52, and downwardly as at 54, the air slowly passing upwardly through the bore and thence through the valve to one of the blow-off valves 26 or 27, as is indicated by the arrows on the drawings.

The downwardly and outwardly flaring seat 54 is formed in the lower end of the nozzle 53 to receive snugly the pointed upper end 19' of the piston rod 19.

In ordinary service applications of air the gradual reduction in the train pipe pressure causes the partial shifting of the main piston of the Westinghouse triple valve and a portion of the air gradually applied to the brake cylinder from the auxiliary reservoir will fill the space 39 and partially raise the piston rod 19, but on account of its gradual application, will not entirely compress the spring 44, and consequently, if the device is set for "Empty", the air will pass through the valve 33 to the blow-off valve 26, (Fig. 4) and upon excessive pressure in the brake cylinder will blow off through said valve to set brakes without locking the wheels and to cause the sliding thereof. This operation is the same when the device is set for loaded position with the exception that a greater pressure is necessary to open the valve 27, the tension of the spring 29 being suitably regulated according to the grip which the load will cause the wheels to have on the rails. When, however, it is desired to set the brakes in an emergency and the train pipe pressure is suddenly greatly reduced, the sudden reduction of pressure allows the pressure in the auxiliary reservoir to entirely compress the graduating spring of the triple valve and said pressure in the chamber 39 will also serve to raise the piston against the force of the spring 44. As the piston is raised the pointed upper end of the piston rod will seat itself within the lower end of the nozzle 53 and thus prevent the air from passing upward through the valve 33 and cause the full pressure to be retained on the brake cylinder. The pointed end of the piston rod prevents any collection of dust or other foreign matter thereon. The placing of the controlling handle 34 in lapped position has a similar effect in that it causes the brakes to operate in the ordinary manner and by cutting off both of the escape passages, permits of only the slight escape of air through the passage 41.

In the valve 33 is formed a passage 55, which registers with an outlet 56, in the casing, when the handle 34 is in the neutral position, as shown in Figs. 2, 7 and 8. When the device is in neutral position it acts as the common drain or bleed, to the ordinary brake system. At the outlet 56 is also mounted a dust guard 56'.

The upper end of the valve 33 is formed with a reduced rectangular stem 57', which projects upwardly through an opening in the top of the casing 21. Bearing on the upper face of the casing plate 37 and loosely mounted on the upper end of the stem is the handle 34. This handle has a cross pin 59' which works in a longitudinal slot 60, in the upper end of the stem 57'. Thus the handle bears on the casing plate, and should any downward pressure be brought to bear on the portion of the handle which is connected to the stem, no movement tending to unseat the valve 33 could take place.

From the foregoing description taken in accordance with the accompanying drawings, the construction and operation of my improved air brake attachment will be readily understood, and it will be seen that I have provided an extremely satisfactory device which can be set to allow of emergency application of the brakes on both loaded and empty cars while automatically preventing such pressure in the brake cylinders of the empty cars as will lock the wheels of said cars and cause flattening thereof, and which device will have additional desirability in that it prevents the brakes from being set by a reduction of but a few pounds in the train pipe pressure although in no wise interfering with the efficient service or emergency brake application.

What is claimed is:

1. The combination with the brake cylinder of an air brake, of a casing in communication therewith, a piston slidably mounted in the casing, a spring for resiliently holding the piston in position, said piston having a hollow piston rod with a passage formed in one side thereof, and the casing having a passage formed therein in communication with the outer air and normally in alinement with the passage of the piston rod to permit of slight escape of air through the said passages.

2. The combination with an air brake cylinder, of a T-shaped casing in communication therewith, a plurality of blow-off valves carried by the casing for yielding at different pressures, a valve for controlling the flow of pressure to any of the blow-off valves, and means for automatically cutting out the various blow-off valves upon application of the emergency.

3. The combination with an air brake cylinder, of a casing in communication therewith, blow-off valves carried by the casing, means for muffling the exhaust from said valve, means for cutting out any or all of said valves, and supplemental means for automatically cutting out said valves upon application of emergency pressure.

4. The combination with an air brake cylinder, of a casing in communication therewith, blow-off valves carried by the upper portion of the casing, means for cutting out any or all of said valves manually, a piston in the lower portion of the casing, an escape port normally open and controlled by the piston, a piston rod secured to the piston, and a pair of springs for resisting movement of the piston but adapted to yield under moderate pressure to allow the piston to shift to close the escape port and to yield under excessive pressure to permit the piston to automatically cut out the blow-off valves.

In testimony whereof, I affix my signature, in presence of two witnesses.

CHELCIAS E. FAULKS.

Witnesses:
    JOHN M. HOLMES,
    ALBERT TAUB.